United States Patent [19]
Hattori et al.

[11] Patent Number: 5,602,210
[45] Date of Patent: Feb. 11, 1997

[54] MOLECULAR COMPOSITE MATERIAL COMPOSED OF LIQUID CRYSTAL POLYMER AND THERMOPLASTIC POLYMER AND METHOD FOR PRODUCING SAME

[75] Inventors: Tatsuya Hattori; Kazuhiro Kagawa, both of Wako, Japan

[73] Assignee: Honda Giken Kogyo Kabushiki Kaisha, Tokyo, Japan

[21] Appl. No.: 674,921

[22] Filed: Jul. 3, 1996

Related U.S. Application Data

[63] Continuation-in-part of Ser. No. 526,660, Sep. 11, 1995, Pat. No. 5,565,530.

[30] Foreign Application Priority Data

Sep. 12, 1994 [JP] Japan .................................. 6-244589
Aug. 28, 1995 [JP] Japan .................................. 7-242528

[51] Int. Cl.$^6$ .................................................. C08F 283/00
[52] U.S. Cl. .......................... 525/419; 525/425; 525/427; 525/437; 525/441; 428/423.1; 428/474.4; 428/480
[58] Field of Search .............................. 525/419, 425, 525/427, 437, 441; 428/423.1, 474.4, 480

[56] References Cited

U.S. PATENT DOCUMENTS

| | | | |
|---|---|---|---|
| 4,048,148 | 9/1977 | Morgan | 260/72.5 |
| 4,122,070 | 10/1978 | Morgan | 528/149 |
| 5,043,400 | 8/1991 | Tsuruta et al. | 525/437 |
| 5,068,292 | 11/1991 | Lenke et al. | 525/509 |
| 5,159,029 | 10/1992 | Pater et al. | 525/421 |
| 5,223,584 | 6/1993 | Lenke et al. | 525/405 |
| 5,223,588 | 6/1993 | Lenke et al. | 525/509 |

FOREIGN PATENT DOCUMENTS

| | | |
|---|---|---|
| 0322943 | 2/1988 | European Pat. Off. . |
| 0408166 | 2/1990 | European Pat. Off. . |
| 2310426 | 7/1976 | France . |
| 1158074 | 6/1989 | France . |
| 1259062 | 10/1989 | Japan . |
| 1320128 | 12/1989 | Japan . |
| 586286 | 4/1994 | Japan . |

OTHER PUBLICATIONS

Communication from the European Patent Office, dated Dec. 22, 1995 with attached European Search Report.

Primary Examiner—Samuel A. Acquah
Attorney, Agent, or Firm—Lyon & Lyon

[57] ABSTRACT

A molecular composite material includes a liquid crystal polymer such as polyazomethine, a thermoplastic polymer such as a polyamide and a compatibilizing agent such as ε-caprolactam having at least one functional group showing compatibility and/or reactivity to the liquid crystal polymer and/or the thermoplastic polymer.

5 Claims, 3 Drawing Sheets

PAM = Polyazomethine

MOLECULAR COMPOSITE MATERIAL COMPOSED OF LIQUID CRYSTAL POLYMER AND THERMOPLASTIC POLYMER AND METHOD FOR PRODUCING SAME

CROSS REFERENCE TO RELATED APPLICATION

This application is a continuation-in-part of U.S. Ser. No. 08/526,660 filed Sep. 11, 1995 now U.S. Pat. No. 5,565,530.

BACKGROUND OF THE INVENTION

The present invention relates to a molecular composite material comprising a liquid crystal polymer and a thermoplastic polymer and a method for producing same, and more particularly to a molecular composite material having good mechanical properties together with excellent heat resistance, water absorption resistance, solvent resistance, etc. and a method for producing same.

Liquid crystal polymers such as polyesters, polyazomethines, etc. show excellent mechanical properties. Among them, polyazomethines are promising as reinforcing resins for molecular composite materials because of good mechanical properties. The details of polyazomethines are described in U.S. Pat. No. 4,048,148. To exhibit the properties of these liquid crystal polymers, they should sufficiently be oriented. However, since the orienting of the liquid crystal polymers at the time of forming makes the resultant formed products anisotropic, the liquid crystal polymers can be used only for limited applications.

Research has been conducted to provide excellent polymer alloys by blending polyazomethines with thermoplastic polymers. For instance, Japanese Patent Laid-Open No. 3-51118 discloses composite materials obtained by dispersing a polyazomethine precursor in a precursor of a matrix polymer, causing the reaction of the polyazomethine precursor to form polyazomethine as a polymer in situ, and then polymerizing the precursor of a matrix polymer. However, sufficient dispersion cannot be achieved between the liquid crystal polymer and the thermoplastic polymer, mainly because they do not have good compatibility.

OBJECT AND SUMMARY OF THE INVENTION

Accordingly, an object of the present invention is to provide a molecular composite material having excellent mechanical properties because of good dispersion of a liquid crystal polymer in a matrix polymer.

Another object of the present invention is to provide a method for producing such a molecular composite material.

As a result of intense research in view of the above objects, the inventors have found that by adding to a blend of a liquid crystal polymer and a thermoplastic polymer a compatibilizing agent having at least one functional group showing compatibility and/or reactivity to the liquid crystal polymer and/or the thermoplastic polymer, it is possible to obtain a molecular composite material having excellent mechanical properties. The present invention has been completed based on this finding.

Thus, the molecular composite material according to the present invention comprises a liquid crystal polymer, a thermoplastic polymer and a compatibilizing agent having at least one functional group showing compatibility and/or reactivity to the liquid crystal polymer and/or the thermoplastic polymer.

The method for producing a molecular composite material according to the present invention comprises the step of blending a liquid crystal polymer, a thermoplastic polymer and a compatibilizing agent having at least one functional group showing compatibility and/or reactivity to the liquid crystal polymer and/or the thermoplastic polymer, at a temperature equal to or higher than the highest melting point of the liquid crystal polymer, the thermoplastic polymer and the compatibilizing agent and lower than the lowest decomposition temperature of the liquid crystal polymer, the thermoplastic polymer and the compatibilizing agent.

DETAILED DESCRIPTION OF THE PREFERRED EMBODIMENTS

Figure 1:
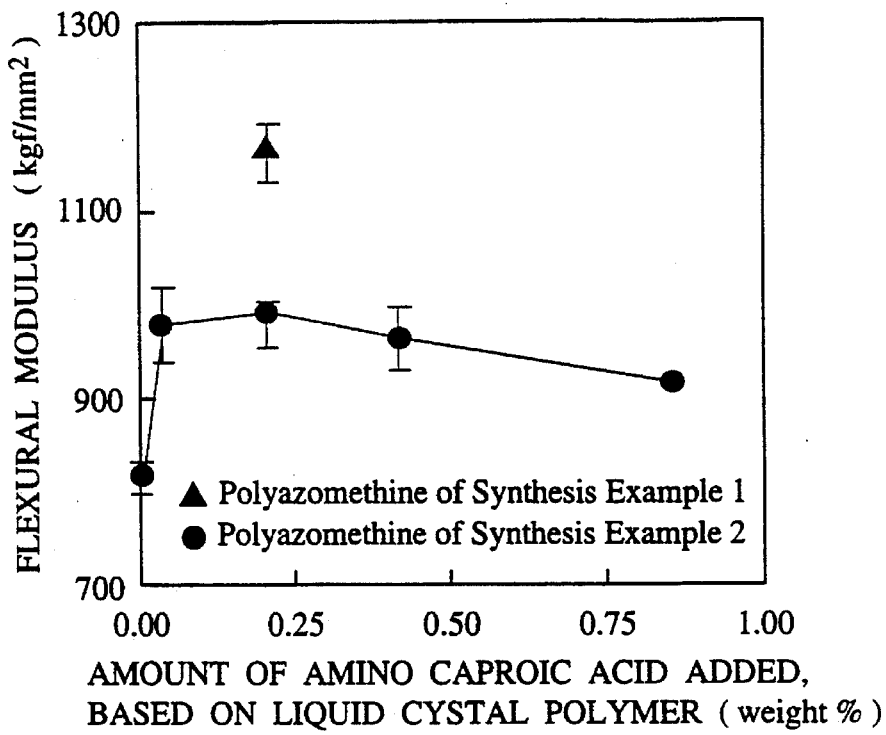
FIG. 1 is a graph showing the measured flexural modulus of the molecular composite material obtained in Example 4.

The present invention will be explained in detail below.

[1] Molecular composite material

The molecular composite material of the present invention comprises a liquid crystal polymer, a thermoplastic polymer and a compatibilizing agent.

(1) Liquid crystal polymer

The liquid crystal polymers which may be used in the present invention are thermotropic liquid crystal polymers, for instance, polymers or copolymers such as polyazomethines, polyesters, polyester amides or copolymers thereof. The preferred liquid crystal polymer is polyazomethine or its copolymer.

(a) Chemical structure of polyazomethine or its copolymer

Polyazomethine is represented, for instance, by the following general formula:

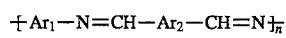

wherein $Ar_1$ and $Ar_2$ are aromatic residual groups, and n is an integer.

A copolymer of polyazomethine is represented, for instance, by the following general formula:

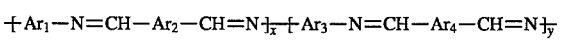

wherein $Ar_1$, $Ar_2$, $Ar_3$ and $Ar_4$ are aromatic residual groups, and x and y are integers.

In either of the above polyazomethine and copolymer thereof, the aromatic residual groups $Ar_1$, $Ar_2$, $Ar_3$ and $Ar_4$ are preferably substituted or unsubstituted phenylene or biphenylene groups. The substituent groups attached to the phenylene or biphenylene groups may be alkyl groups having preferably 1–5 carbon atoms, alkoxy groups having preferably 1–5 carbon atoms, a hydroxyl group, halogen groups, etc.
The specific examples of polyazomethine may be as follows:
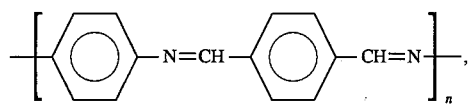
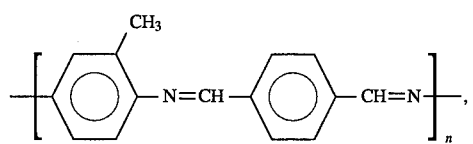
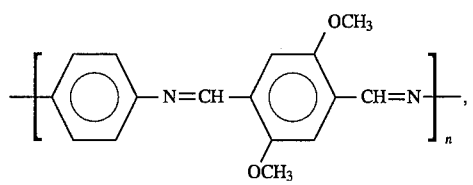
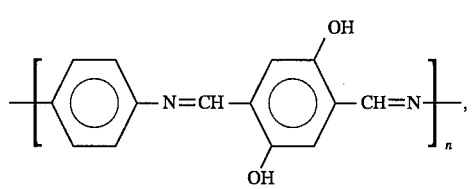
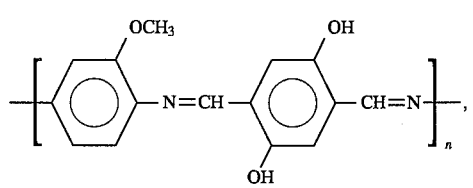
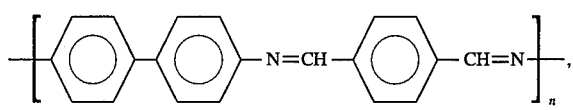
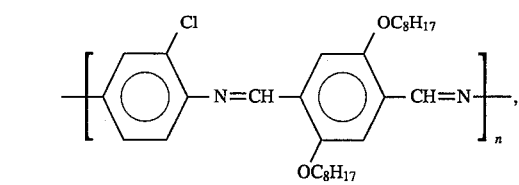
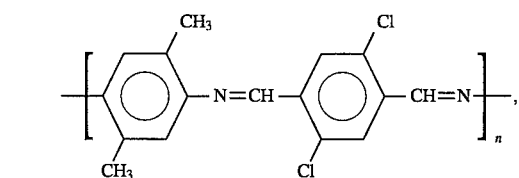
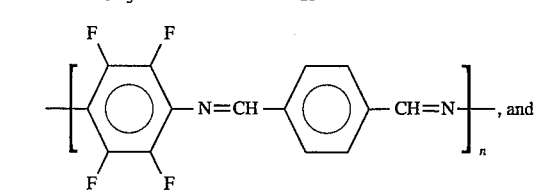
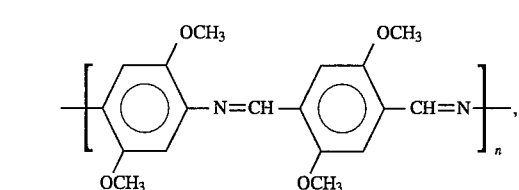
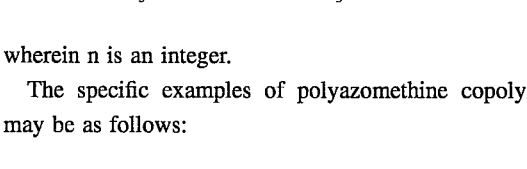
wherein n is an integer.
The specific examples of polyazomethine copolymers may be as follows:
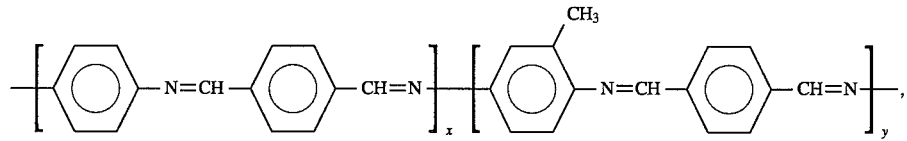
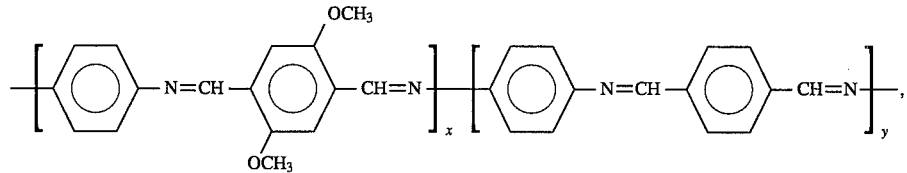
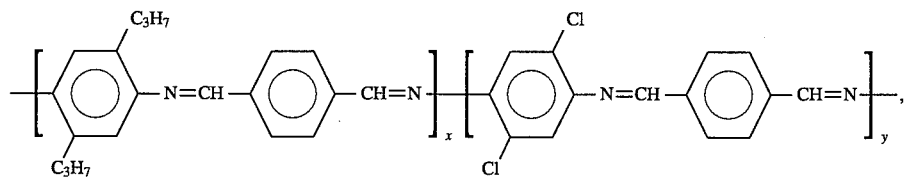

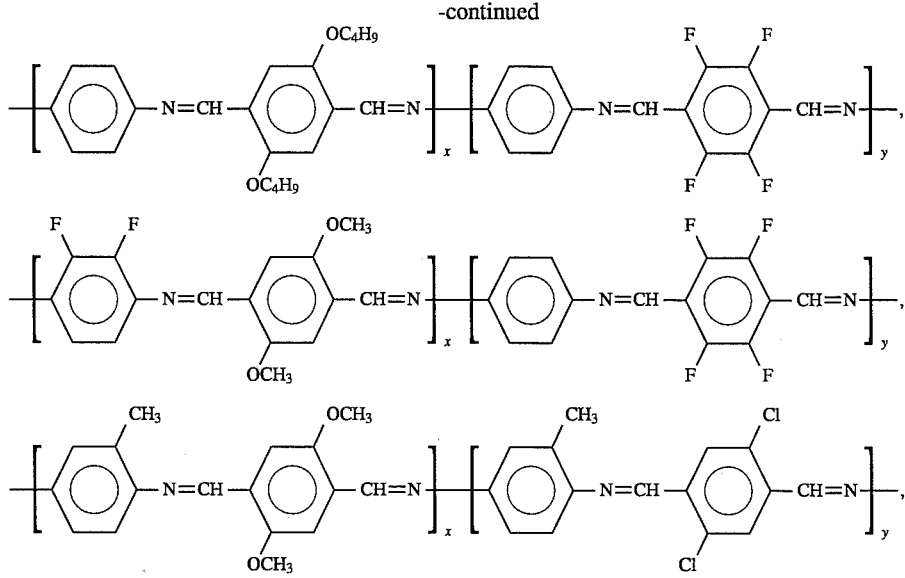

wherein x and y are integers.

Since the explanation of polyazomethine is essentially applicable to the copolymer of polyazomethine, explanation will be made only on the polyazomethine below. Accordingly, it should be noted that when there is no explanation on the copolymer of polyazomethine, the explanation of polyazomethine will be applicable as it is.

(b) Production of polyazomethine

Polyazomethine may be formed by polymerizing aromatic diamine and aromatic dialdehyde. The preferred aromatic diamines are substituted or unsubstituted p-phenylene diamines. The preferred aromatic dialdehydes are terephthalaldehyde, etc. Examples of the substituted phenylene diamines are p-tolylenediamine, 2-chloroparaphenylene diamine, etc. The production method of polyazomethine itself is known in the art as disclosed in U.S. Pat. No. 4,048,148.

A typical production method of polyazomethine is as follows: Aromatic diamine, N-methyl-2-pyrrolidone and lithium carbonate are introduced into a three-necked flask and stirred, and terephthalaldehyde is added and stirred for 0.5–6 hours. To keep sufficient stirring, an appropriate amount of N-methyl-2-pyrrolidone is preferably added in the course of reaction. Thereafter, p-aminoacetonitrile is added and further stirred for 16–48 hours. After completion of reaction, the resultant reaction product is washed with water and methanol several times and then vacuum-dried at about 80° C. to obtain polyazomethine.

(c) Properties of polyazomethine

The polyazomethine preferably has an average molecular weight of 3,000–20,000 and a logarithmic viscosity number of 0.5–2.5 dl/g at 30° C. in sulfuric acid, more preferably 1.0–2.0 dl/g.

(d) Heat treatment of polyazomethine

A heat treatment increases the molecular weight of polyazomethine, contributing to an improvement of mechanical properties of molecular composite materials produced therefrom. The heat treatment conditions are preferably a temperature range of 180°–280° C. and a time period of 0.5–5 hours, more preferably 210°–250° C. and 1–2 hours. With respect to the heat treatment temperature, when it is lower than 180° C., sufficient heat treatment effects cannot be obtained. On the other hand, when it exceeds 280° C., the polyazomethine is melted. With respect to the heat treatment time, when it is shorter than 0.5 hours, sufficient heat treatment effects cannot be obtained. On the other hand, even if it exceeds 5 hours, further effects would not be able to be obtained.

(2) Thermoplastic polymer

The thermoplastic polymers which may be used in the present invention are aliphatic or aromatic polyamides or copolyamides, polyethylene terephthalate, polybutylene terephthalate, etc. The preferred thermoplastic polymers are aliphatic or aromatic nylon. One example of the preferred nylon is an aliphatic polyamide constituted by structural units represented by the following general formula:

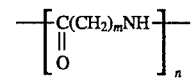

wherein m is an integer of 1–12. Particularly preferable as such aliphatic polyamide is nylon 6. These polyamides function to reduce the anisotropy of the formed molecular composite materials of polyazomethine, thereby imparting excellent mechanical properties to the molecular composite materials.

(3) Compatibilizing agent

The compatibilizing agent is a compound having at least one functional group showing compatibility and/or reactivity to the liquid crystal polymer and/or the thermoplastic polymer. The term "compatibility" used herein means that polymers can microscopically be dispersed in each other. Better compatibility provides higher dispersion of each polymer, making it possible to exhibit properties of materials more efficiently. The functional groups showing compatibility and/or reactivity are —COOH, —NH$_2$, —OH, an amido group, an ester group, etc.

The compatibilizing agents may be (i) monomers of the liquid crystal polymers and/or the thermoplastic polymers, (ii) compounds partly having the same structures as those of the liquid crystal polymers and/or the thermoplastic polymers, or (iii) compounds obtained by decomposing the liquid crystal polymers and/or the thermoplastic polymers. Particularly suitable as such compatibilizing agents are monomers of thermoplastic polymers, compounds partly having the same structures as those of such monomers, or compounds obtained by decomposing the thermoplastic polymers.

Though changeable depending on the types of the liquid crystal polymers and the thermoplastic polymers, the compatibilizing agents may be monomers such as ε-caprolactam, ζ-enantholactam, ω-caprylolactam, ω-decanolactam, ω-laurolactam, α-pyrrolidone, α-piperidone, etc., and low-molecular weight polyamides (nylon) such as amino caproic acid, adipic acid, etc., when nylon 6 is used as a thermoplastic polymer. In the case of low-molecular weight nylon, it preferably has a polymerization degree of 2–100. When the polymerization degree of the low-molecular weight nylon exceeds 100, it fails to exhibit a good compatibilizing function.

[2] Production of molecular composite material

The molecular composite material of the present invention may be produced by blending the liquid crystal polymer, the thermoplastic polymer and the compatibilizing agent at a uniform temperature. A weight ratio of the liquid crystal polymer to the thermoplastic polymer is preferably 10:90–90:10, particularly 30:70–85:15.

The amount of the compatibilizing agent is 0.01–20 weight % based on the weight of the liquid crystal polymer. When the amount of the compatibilizing agent is smaller than 0.01 weight %, the molecular composite material does not have improved properties such as bending strength, flexural modulus, etc. On the other hand, when the amount of the compatibilizing agent exceeds 20 weight %, the molecular composite material shows decreased flexural modulus. The more preferred amount of the compatibilizing agent is 0.01–10 weight % based on the weight of the liquid crystal polymer, particularly 0.01–5 weight %.

Blending apparatuses usable for the production of the molecular composite materials are a single-screw blender, a double-screw blender, etc. The blending temperature may be changeable depending on the types of the liquid crystal polymers, the thermoplastic polymers and the compatibilizing agents, but it should be equal to or higher than the highest melting point of the above three components (liquid crystal polymer, thermoplastic polymer and compatibilizing agent) and lower than the lowest decomposition temperature of the three components. In general, the blending temperature is preferably 200°–320° C., more preferably 230°–300° C. When the blending temperature is lower than 200° C., the compatibilizing agent cannot exhibit sufficient compatibilizing effects on the liquid crystal polymer and/or the thermoplastic polymer. On the other hand, when the blending temperature exceeds 320° C., the constituent polymers are likely to be decomposed.

The liquid crystal polymer, the thermoplastic polymer and the compatibilizing agent may be introduced into the blending apparatus simultaneously or successively in an arbitrary order. In a preferred embodiment, the compatibilizing agent is added after the liquid crystal polymer and the thermoplastic polymer are blended in the blending apparatus for 0.5–10 minutes.

The blending time of the compatibilizing agent may be changeable depending on the types of the liquid crystal polymer, the thermoplastic polymer and the compatibilizing agent, but it is preferably 0.5–60 minutes, more preferably 5–60 minutes. When the blending time is shorter than 0.5 minutes, sufficient blending cannot be achieved. On the other hand, when the blending time exceeds 60 minutes, the number of double bonds in the liquid crystal polymer decreases, resulting in decreased liquid crystallinity.

Explanations have been made above on the molecular composite material of the present invention taking polyazomethine and nylon as specific examples of a liquid crystal polymer and a thermoplastic polymer, but it should be noted that the present invention is not restricted to such specific examples, and that various modifications and changes may be made within the scope of the present invention.

By adding the compatibilizing agent to a molecular composite material of a liquid crystal polymer and a thermoplastic polymer, uniform dispersion can be achieved between the liquid crystal polymer and the thermoplastic polymer in the molecular composite material, thereby providing the molecular composite material with improved mechanical properties.

The present invention will be explained in further detail by the following Examples without intention of restricting the scope of the present invention defined by the claims attached hereto. Polyazomethines used in Examples are those synthesized in the following Synthesis Examples.

Synthesis Example 1

97.5 g of p-tolylenediamine hydrochloride, 375 ml of N-methyl-2-pyrrolidone and 37.0 g of lithium carbonate were introduced into a three-necked flask. After stirring, 67.0 g of terephthalaldehyde was added and stirred for 3 hours. In the course of reaction, an appropriate amount of N-methyl-2-pyrrolidone was added to keep sufficient stirring. Thereafter, 1.0 g of p-aminoacetanilide was added and further stirred for 20 hours to conduct reaction. The resultant reaction product was filtered out, washed with water and methanol several times, vacuum-dried at 80° C. to obtain 107.3 g of polyazomethine powder in orange color. This polyazomethine powder was heat-treated at 230° C. for 2 hours to obtain polyazomethine having a logarithmic viscosity number $\eta_{inh}$ of 1.77 at 30° C. in sulfuric acid.

Synthesis Example 2

97.5 g of p-tolylenediamine hydrochloride, 200 ml of N-methyl-2-pyrrolidone and 37.0 g of lithium carbonate were introduced into a three-necked flask. A solution of 67.0 g of terephthalaldehyde in 300 ml of N-methyl-2-pyrrolidone was gradually charged into the three-necked flask while stirring. After 15 minutes, a solution of 1.0 g of p-aminoacetanilide in 130 ml of N-methyl-2-pyrrolidone was added and further stirred for 16 hours to conduct reaction. The resultant reaction product was filtered out, washed with water and methanol several times, vacuum-dried at 80° C. to obtain 105.3 g of polyazomethine powder in brownish red color. This polyazomethine powder was heat-treated at 230° C. for 2 hours to obtain polyazomethine having a logarithmic viscosity number $\eta_{inh}$ of 0.97 at 30° C. in sulfuric acid.

Reference Example 1

Influence of heat treatment temperature on the viscosity of polyazomethine

The polyazomethine synthesized in the same manner as in Synthesis Example 2 was uniformly cast in a stainless steel container, placed in a furnace (vacuum drying furnace), heated for 1 hour after evacuation, and left to cool immediately after recovering from the furnace. The heating temperature was 150° C., 200° C., and 250° C. The polyazomethine was added to concentrated sulfuric acid at 30° C. such that the resultant polyazomethine solution had a concentration of 0.5 g/dl. The logarithmic viscosity number of polyazomethine was measured with an Ostwald viscometer (No. 4). The measurement results of the logarithmic viscosity number of polyazomethine before and after the heat treatment are shown in Table 1. Incidentally, data in Table 1 are average values of three measurements.

TABLE 1

|  | Blank[1] | —[2] | Heat treatment Temperature of Polyazomethine | | |
|---|---|---|---|---|---|
|  |  |  | 150° C. | 200° C. | 250° C. |
| Flow-down Time (sec.) | 37.9 | 50.6 | 53.4 | 52.6 | 57.2 |
| Logarithmic Viscosity Number | — | 0.58 | 0.68 | 0.65 | 0.82 |

Note
[1]Only sulfuric acid (no polyazomethine).
[2]No heat treatment.

As is clear from Table 1, the polyazomethine subjected to no heat treatment has a logarithmic viscosity number of 0.58 while the heat-treated polyazomethine has an increased logarithmic viscosity number. This is because the molecular weight of the polyazomethine was increased by the heat treatment. When the heat treatment temperature was 150°–200° C., there was no substantial increase in logarithmic viscosity number (molecular weight) by the heat treatment. However, when the polyazomethine was heat-treated at 250° C., the logarithmic viscosity number of the polyazomethine was drastically increased to 0.82.

It was found that the heat treatment changed the color of polyazomethine from orange color in an untreated state to yellow color after the heat treatment at 150° C. and 200° C. and to brown color with metallic gloss after the heat treatment at 250° C.

Reference Example 2

Influence of heat treatment time on the viscosity of polyazomethine

The polyazomethine powder obtained in the same manner as in Reference Example 1 was uniformly cast in a stainless steel container, placed in a furnace (vacuum drying furnace) heated to 210° C. to conduct a heat treatment for 1 hour, 3 hours and 5 hours, respectively after evacuation. The heat-treated polyazomethine was added to concentrated sulfuric acid at 30° C. such that the resultant polyazomethine solution had a concentration of 0.5 g/dl to measure the logarithmic viscosity number of polyazomethine with an Ostwald viscometer (No. 4). The measurement results of the logarithmic viscosity number of polyazomethine before and after the heat treatment are shown in Table 2. Incidentally, data in Table 2 are average values of three measurements.

TABLE 2

|  | Blank[1] | —[2] | Heat treatment Time of Polyazomethine | | |
|---|---|---|---|---|---|
|  |  |  | 1 hour | 3 hours | 5 hours |
| Flow-down Time (sec.) | 37.3 | — | 55.2 | 55.5 | 56.0 |
| Logarithmic Viscosity Number | — | 0.58 | 0.78 | 0.80 | 0.81 |

Note
[1]Only sulfuric acid (no polyazomethine).
[2]No heat treatment.

The heat treatment for 1 hour changed the logarithmic viscosity number from 0.58 dl/g to 0.78 dl/g, providing an increase in a molecular weight. However, a heat treatment for a longer period of time did not substantially change the viscosity of polyazomethine, providing 0.81 dl/g even after 5 hours.

Example 1

42 g of polyazomethine obtained in Synthesis Example 1 and 18 g of nylon 6 (average molecular weight=17,000, available from Aldrich) were introduced into a double-screw blender to carry out melt blending at 270° C. After blending for 5 minutes, 0.2 g (0.25 weight % based on polyazomethine) of amino caproic acid was added and further melt-blended for 50 minutes. The melt-blended sample was injection-molded by a small injection molding machine to provide a test piece of 50 mm×15 mm×2 mm. Three-point bending test was conducted on this planer sample to measure a bending strength and a flexural modulus thereof. The results are shown in Table 3.

Example 2

42 g of polyazomethine obtained in Synthesis Example 1 and 17.4 g of nylon 6 (average molecular weight=17,000, available from Aldrich) were introduced into a double-screw blender to carry out melt blending at 270° C. After blending for 5 minutes, 0.6 g (0.75 weight % based on polyazomethine) of ε-caprolactam was added and further melt-blended for 40 minutes. The melt-blended sample was injection-molded by a small injection molding machine to provide a test piece of 50 mm×15 mm×2 min. Three-point bending test was conducted in the same manner as in Example 1 to measure a bending strength and a flexural modulus of the test piece. The results are shown in Table 3.

Example 3

42 g of polyazomethine obtained in Synthesis Example 1 and 14 g of nylon 6 (average molecular weight=17,000, available from Aldrich) were introduced into a double-screw blender to carry out melt blending at 270° C. After blending for 5 minutes, 4 g (0.95 weight % based on polyazomethine) of low-molecular weight nylon having an average molecular weight of 5,000 was added and further melt-blended for 40 minutes. The melt-blended sample was injection-molded by a small injection molding machine to provide a test piece of 50 mm×15 mm×2 mm. Three-point bending test was conducted in the same manner as in Example 1 to measure a bending strength and a flexural modulus of the test piece. The results are shown in Table 3.

Comparative Example 1

42 g of polyazomethine obtained in Synthesis Example 1 and 18 g of nylon 6 (average molecular weight=17,000, available from Aldrich) were introduced into a double-screw blender to carry out melt blending at 270° C. for 40 minutes. The melt-blended sample was injection-molded by a small injection molding machine to provide a test piece of 50 mm×15 mm×2 mm. Three-point bending test was conducted in the same manner as in Example 1 to measure a bending strength and a flexural modulus of the test piece. The results are shown in Table 3.

TABLE 3

| No. | Bending strength (kgf/mm$^2$) | Flexural modulus (kgf/mm$^2$) |
| --- | --- | --- |
| Example 1 | 15.3 | 1191.0 |
| Example 2 | 14.0 | 1119.0 |
| Example 3 | 12.7 | 880.0 |
| Com. Ex. 1 | 8.3 | 803.9 |

As is clear from Table 3, the molecular composite material of Examples 1–3 showed higher bending strength and flexural modulus than those of the molecular composite material of Comparative Example 1 containing no compatibilizing agent.

Example 4

42 g of polyazomethine obtained in Synthesis Example 2 and 18 g of nylon 6 (average molecular weight=17,000, available from Aldrich) were introduced into a double-screw blender to carry out melt blending at 270° C. After blending for 5 minutes, amino caproic acid was added in an amount of 0 g, 0.04 g, 0.21 g, 0.42 g and 0.86 g (0 weight %, 0.1 weight %, 0.5 weight %, 1.0 weight % and 2.0 weight % based on polyazomethine), respectively, and melt-blended until a torque detector of the blending machine showed 0.4 kgf.m (at 50 rpm). The melt-blended sample was injection-molded by a small injection molding machine to provide a test piece of 50 mm×15 mm×2 mm.

A sample was prepared in the same manner as above except for adding 0.1 g (0.25 weight %) of amino caproic acid to the polyazomethine obtained in Synthesis Example 1, and injection-molded to provide a test piece of 50 mm×15 mm×2 mm.

Figure 2:
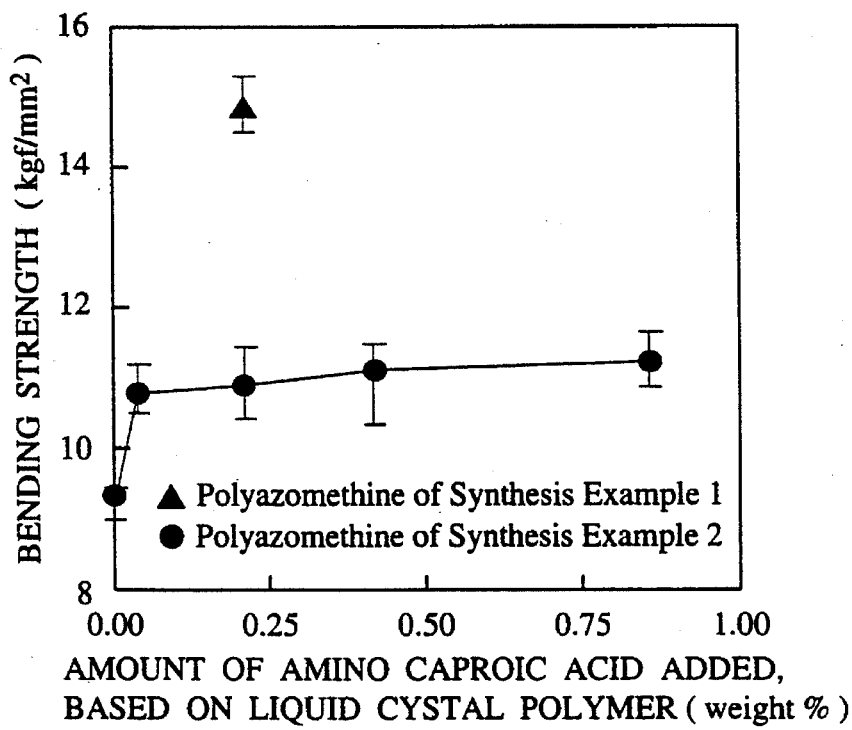
FIG. 2 is a graph showing the measured bending strength of the molecular composite material obtained in Example 4.

Each test piece was subjected to a three-point bending test to measure a bending strength and a flexural modulus thereof. The measured flexural modulus is shown in FIG. 1, and the measured bending strength is shown in FIG. 2. In the figures, black triangle plots indicate average values in the case of using the polyazomethine obtained in Synthesis Example 1, and black circle plots indicate average values in the case of using the polyazomethine obtained in Synthesis Example 2. Also, a vertical line in each point indicates a range of the measured values.

As is clear from FIG. 1, the molecular composite material was provided with extremely improved flexural modulus by adding amino caproic acid as a compatibilizing agent. However, an increase over 0.25 weight % in the amount of amino caproic acid added leads to a gradual decrease in the flexural modulus of the resultant molecular composite material. FIG. 2 shows that the addition of up to 0.04 g of amino caproic acid results in a drastic increase in the bending strength of the molecular composite material, and that a further increase in the amount of amino caproic acid added leads to a slight increase in the bending strength of the molecular composite material.

Example 5

Figure 3:
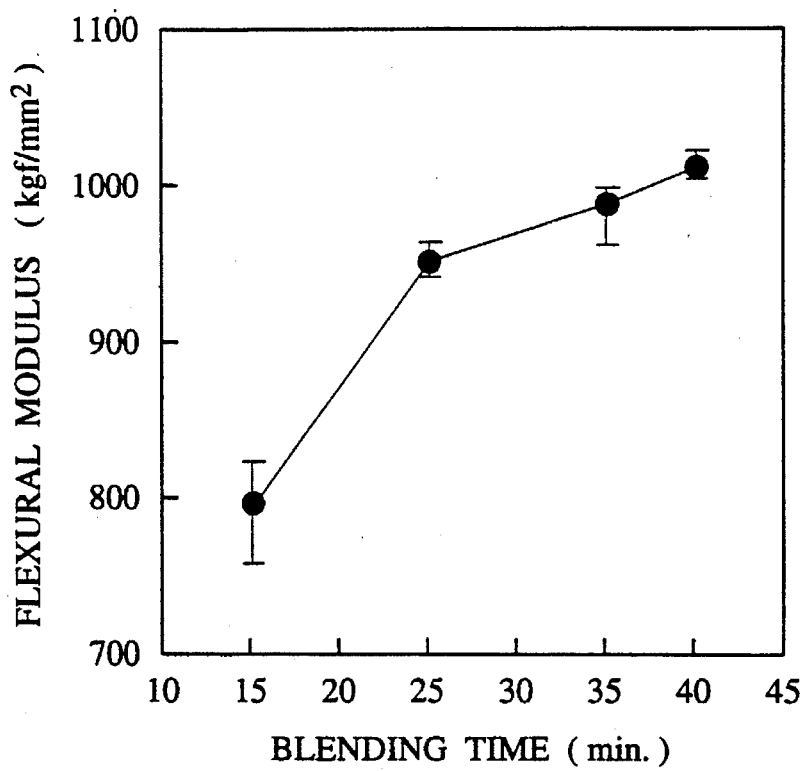
FIG. 3 is a graph showing the measured flexural modulus of the molecular composite material obtained in Example 5.
Figure 4:
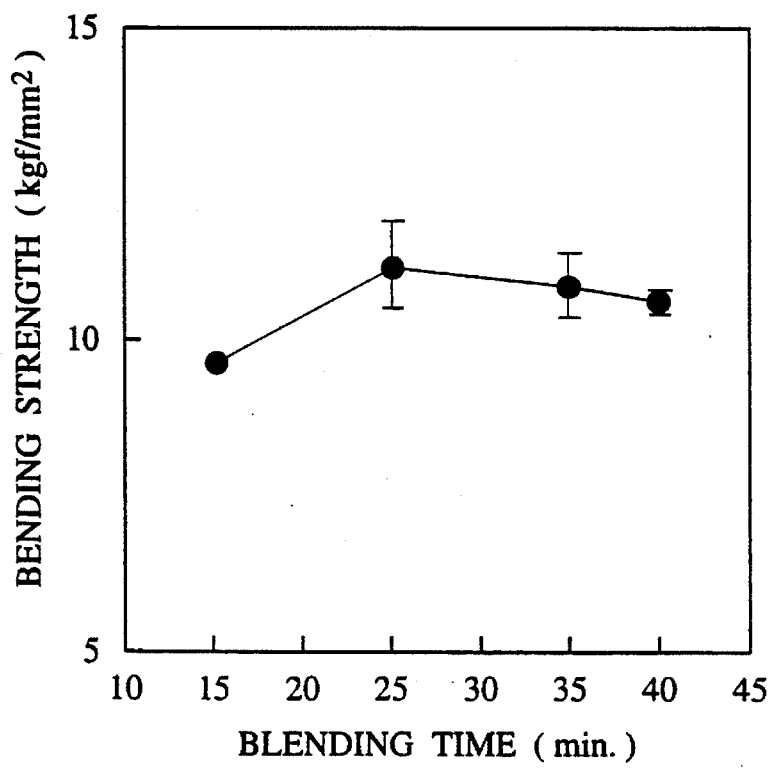
FIG. 4 is a graph showing the measured bending strength of the molecular composite material obtained in Example 5.
Figure 5:
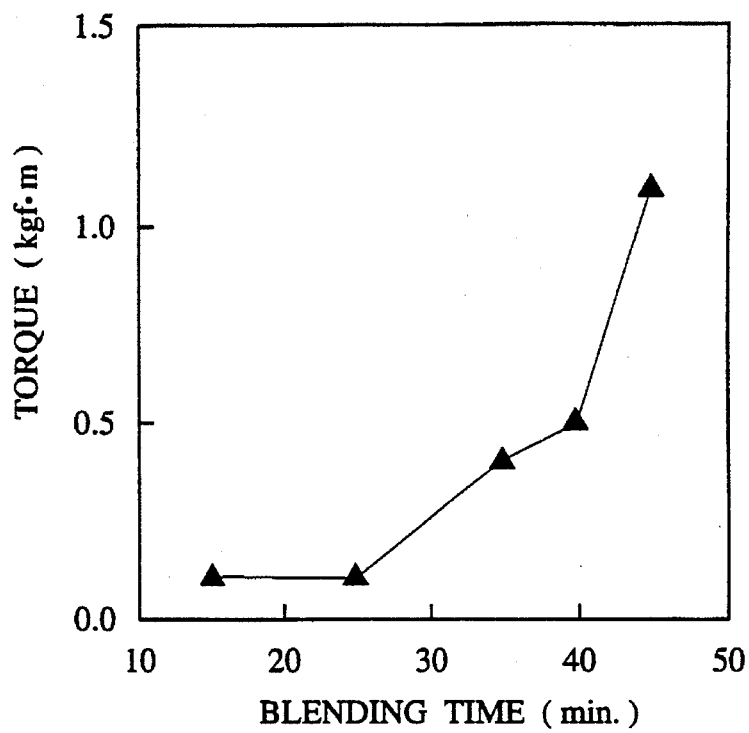
FIG. 5 is a graph showing the blender torque measured in Example 5.

42 g of polyazomethine obtained in Synthesis Example 2 and 18 g of nylon 6 (average molecular weight=17,000, available from Aldrich) were introduced into a double-screw blender to carry out melt blending at 270° C. After blending for 5 minutes, 0.2 g (0.25 weight % based on polyazomethine) of amino caproic acid was added, and melt-blended for 15 minutes, 25 minutes, 35 minutes and 40 minutes, respectively. The melt-blended sample was injection-molded by a small injection molding machine to provide a test piece (plate) of 50 mm×15 mm×2 mm. Each test piece was subjected to a three-point bending test to measure a bending strength and a flexural modulus thereof. The measured flexural modulus is shown in FIG. 3, and the measured bending strength is shown in FIG. 4. In the figures, black circle plots indicate average values of the measured data, and a vertical line in each point indicates a range of the measured values. A blender torque was measured at the end of each blending period, and the results are shown in FIG. 5.

As is clear from FIG. 3, the longer the blending time, the larger the flexural modulus of the resultant molecular composite material. FIG. 4 indicates that the bending strength had a peak at a blending time of 25 minutes. However, as shown in FIG. 5, a longer blending time leads to a larger blender torque, and that the torque increased drastically when the blending time exceeded 40 minutes. This is due to that fact that polymerization proceeds in the molecular composite material as the blending time passes, resulting in an increase in a melt viscosity. When the blending time exceeded 45 minutes, the molecular composite material showed too high melt viscosity, making it impossible to carry out injection molding.

Example 6

70 weight % of polyazomethine ($\eta_{inh}$=1.77 dl/g) obtained in Synthesis Example 1 and 30 weight % of nylon 6 (average molecular weight=17,000, available from Aldrich) were introduced into a double-screw blender to carry out melt blending at 270° C. for 50 minutes in a nitrogen atmosphere. After blending for 5 minutes, 0.25 weight %, based on polyazomethine, of amino caproic acid was added and further melt-blended for 40 minutes. The melt-blended sample was injection-molded to provide a test piece of 50 mm×15 mm×2.5 mm.

In addition, a test piece was prepared in the same manner as above except for using the polyazomethine ($\eta_{inh}$=0.97 dl/g) obtained in Synthesis Example 2. Further, the same test piece as above was formed from nylon 6 only.

Figure 6:
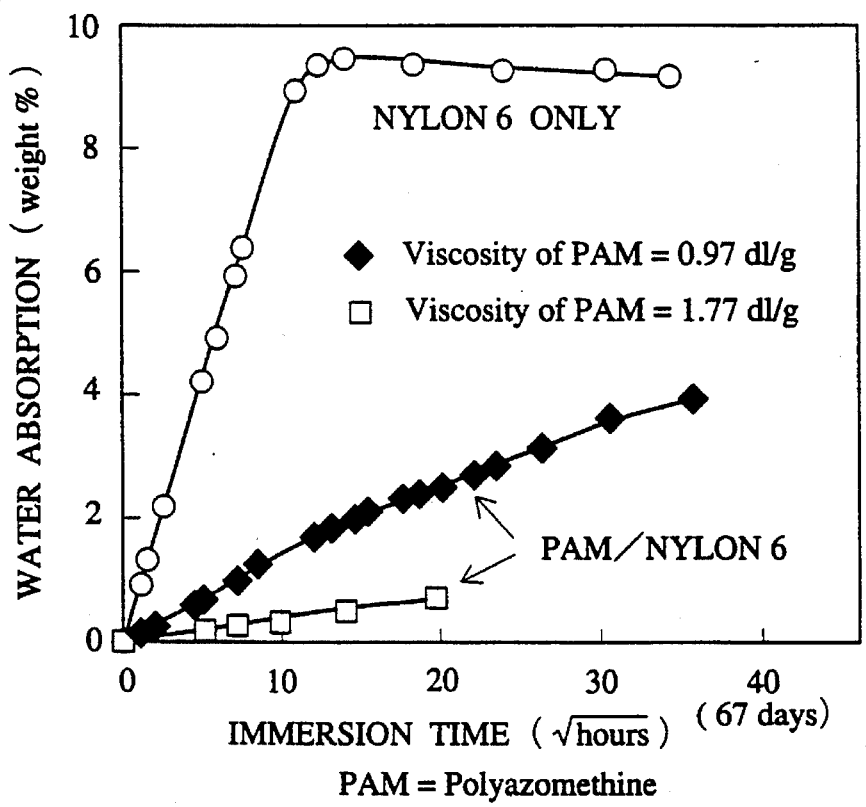
FIG. 6 is a graph showing the relation between the water absorption percentage of the molecular composite material and immersion time in Example 6.

Each test piece was vacuum-dried at 100° C. overnight and immersed in a distilled water at 40° C. in a period up to 67 days. The relations between the water absorption percentage (weight %) of each test piece and the immersion time (square root of hours) are shown in FIG. 6. The water absorption percentage was calculated by the following equation:

Water absorption percentage=(weight of water absorbed−initial weight)/initial weight×100.

As is clear from FIG. 6, the water absorption percentage increased linearly until it slightly passed 100 hours in the case of nylon 6 only, proving that water was absorbed according to a general diffusion mechanism. After 100 hours, the water absorption percentage was saturated to about 95% and leveled off.

In the case of 70 weight % of polyazomethine/30 weight % of nylon 6, the resultant molecular composite material had improved water absorption resistance as compared with that containing nylon 6 only. Under the same blending conditions, the water absorption percentage largely differed depending on the amount of polyazomethine added, proving that water absorption percentage can be suppressed by using polyazomethine having a large molecular weight (compare black square plots and white square plots in FIG. 6).

Also, in the case of 70 weight % of polyazomethine/30 weight % of nylon 6, water absorption percentage did not reach the saturation level even after 67 days of immersion. Thus, it was confirmed that the molecular composite material of the present invention had excellent water absorption resistance.

As described in detail above, by adding to a liquid crystal polymer and/or a thermoplastic polymer a compatibilizing agent having at least one functional group showing compatibility and/or reactivity to the liquid crystal polymer and/or the thermoplastic polymer, the liquid crystal polymer and the thermoplastic polymer are well dispersed in each other, thereby providing the resultant molecular composite material with excellent mechanical properties, heat resistance, water absorption resistance, solvent resistance, etc. The molecular composite material of the present invention having such properties can be used for wide applications such as automobile parts, aircraft parts, spacecraft parts, etc.

What is claimed is:

1. A molecular composite material comprising a liquid crystal polymer, a thermoplastic polymer and a compatibilizing agent having at least one functional group showing compatibility and/or reactivity to said liquid crystal polymer and/or said thermoplastic polymer, wherein said liquid crystal polymer is polyazomethine or its copolymer.

2. A method for producing a molecular composite material comprising the step of blending a liquid crystal polymer, a thermoplastic polymer and a compatibilizing agent having at least one functional group showing compatibility and/or reactivity to said liquid crystal polymer and/or said thermoplastic polymer, at a temperature equal to or higher than the highest melting point of said liquid crystal polymer, said thermoplastic polymer and said compatibilizing agent and lower than the lowest decomposition temperature of said liquid crystal polymer, said thermoplastic polymer and said compatibilizing agent, wherein the weight ratio of the liquid crystal polymer which is blended with the thermoplastic copolymer is between 10:90 and 90:10.

3. The method for producing a molecular composite material according to claim 2, wherein the weight ratio of the liquid crystal polymer which is blended with the thermoplastic copolymer is between 30:70 and 85:15.

4. A method for producing a molecular composite material comprising the step of blending a liquid crystal polymer, a thermoplastic polymer and a compatibilizing agent having at least one functional group showing compatibility and/or reactivity to said liquid crystal polymer and/or said thermoplastic polymer, at a temperature equal to or higher than the highest melting point of said liquid crystal polymer, said thermoplastic polymer and said compatibilizing agent and lower than the lowest decomposition temperature of said liquid crystal polymer, said thermoplastic polymer and said compatibilizing agent, wherein the amount of the compatibilizing agent blended with the liquid crystal polymer and the thermoplastic polymer is between 0.01–20 weight % based on the weight of the liquid crystal polymer.

5. The method for producing a molecular composite material according to claim 4, wherein the amount of the compatibilizing agent blended with the liquid crystal polymer and the thermoplastic polymer is between 0.01–5 weight % based on the weight of the liquid crystal polymer.

* * * * *